March 31, 1942.  R. E. HORGER  2,277,979
BEARING SEAL
Filed Feb. 3, 1941  2 Sheets-Sheet 1

INVENTOR:
Ralph E. Horger
by [signature]
HIS ATTORNEYS.

March 31, 1942.  R. E. HORGER  2,277,979

BEARING SEAL

Filed Feb. 3, 1941  2 Sheets-Sheet 2

INVENTOR:
Ralph E. Horger
by Carrot Parrot Knavely
HIS ATTORNEYS

Patented Mar. 31, 1942

2,277,979

UNITED STATES PATENT OFFICE 2,277,979

BEARING SEAL

Ralph E. Horger, Canton, Ohio, assignor to The Timken Roller Bearing Company, Canton, Ohio, a corporation of Ohio Application February 3, 1941, Serial No. 377,104

6 Claims. (Cl. 286—5)

This invention relates to sealed rotary antifriction bearings, and more particularly to the locking means for the detachable oil retaining end closures of roller bearings. The invention has for its principal object to provide a simple, economical and compact lock which will securely hold the end closure of the bearing in place and which can be quickly and easily mounted in and removed from the bearing. The invention consists in the end closure locking ring and in the parts and combinations and arrangements of parts hereinafter described and claimed.

Figure 1:
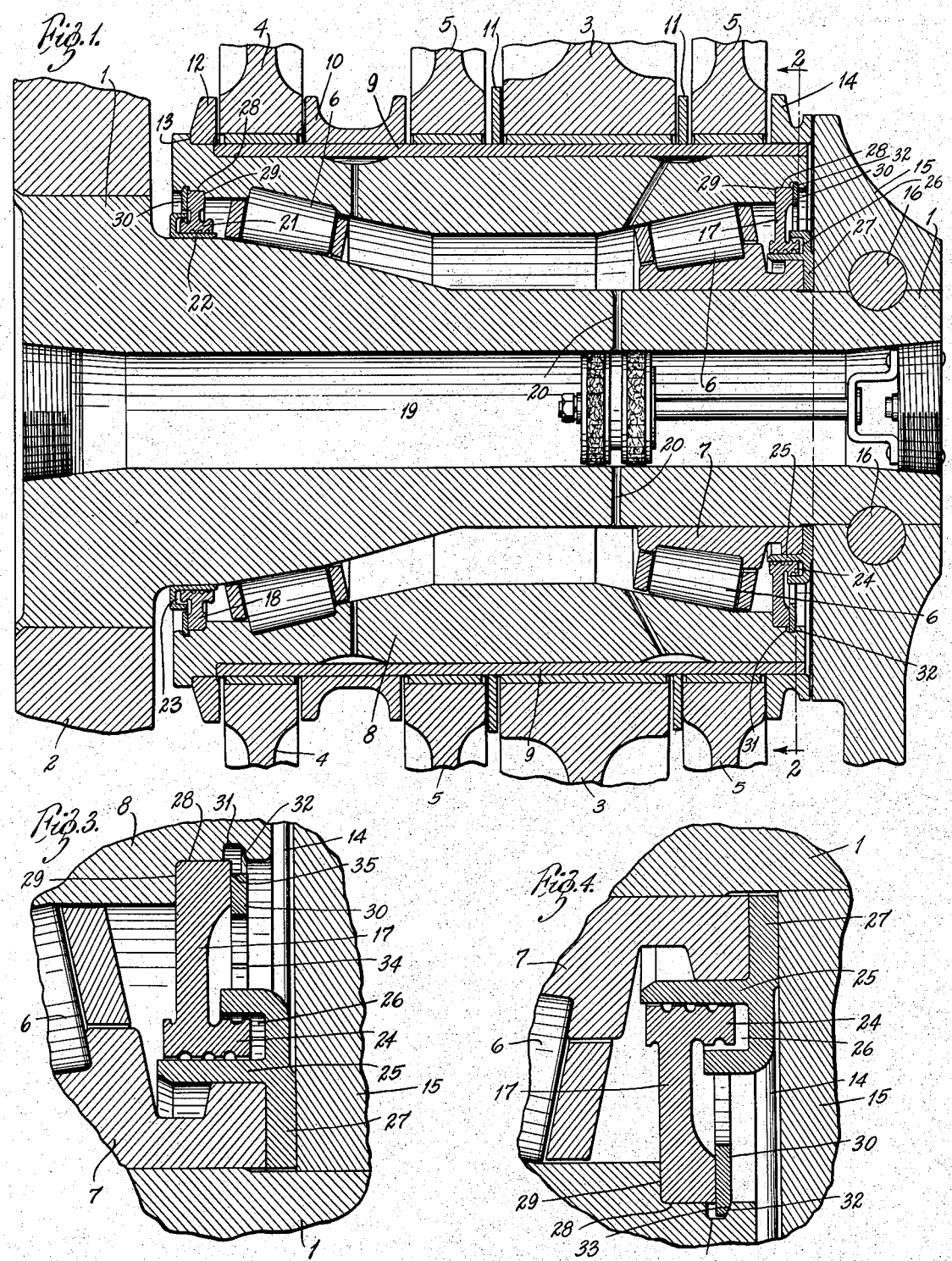
Figure 2:
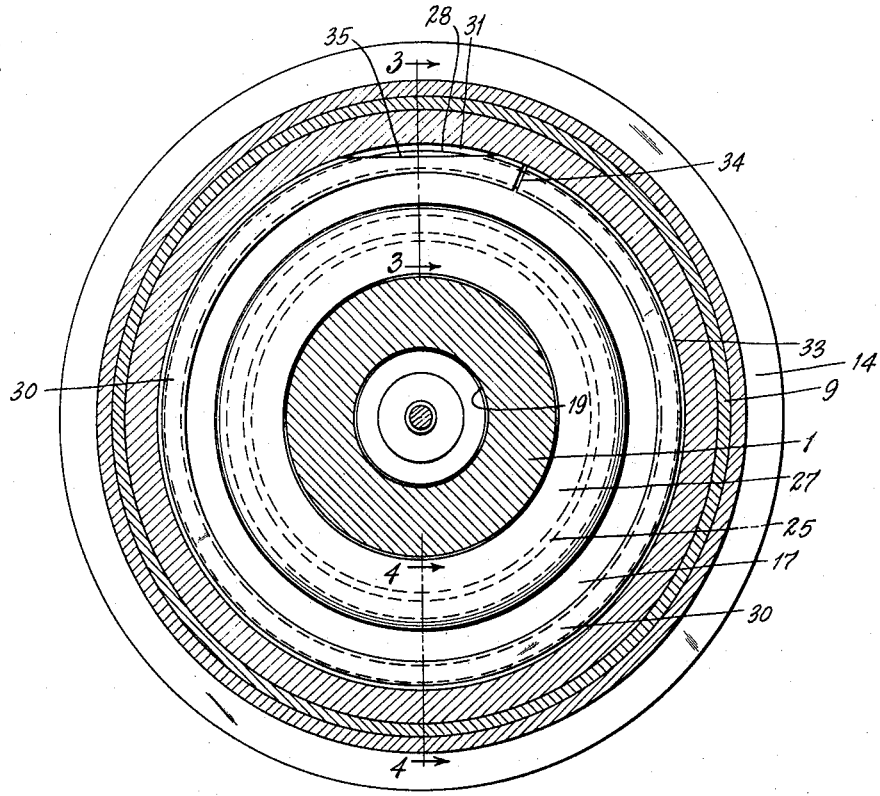
Figure 6:
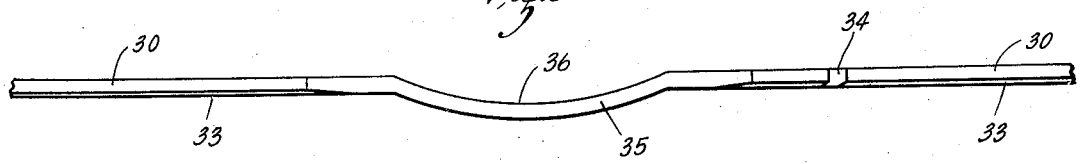
Figure 5:
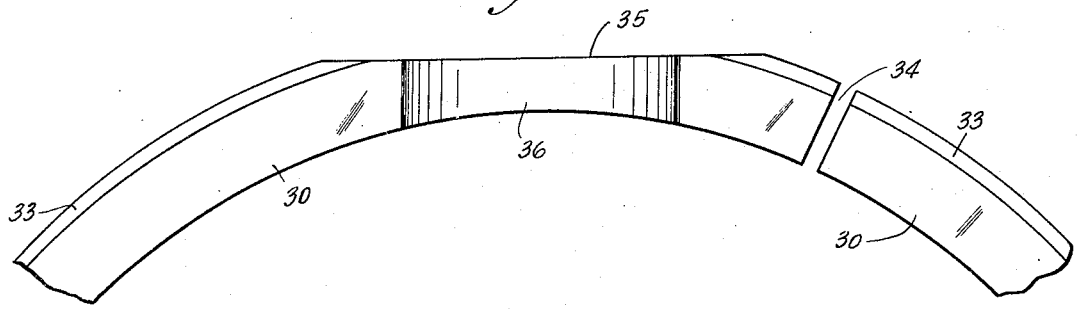

In the accompanying drawings, which form part of this specification and wherein like symbols refer to like parts wherever they occur, Fig. 1 is a central longitudinal section through a locomotive rod bearing embodying my invention, Fig. 2 is a cross section on the line 2—2 in Fig. 1, Figs. 3 and 4 are enlarged fragmentary radial sections through said bearing on the lines 3—3 and 4—4, respectively, in Fig. 2, Fig. 5 is a fragmentary end view of the detached locking ring; and Fig. 6 is an edge view of the portion of the locking ring shown in Fig. 5.

In the accompanying drawings, my invention is shown embodied in a locomotive rod bearing construction comprising a crank pin or shaft 1 rigid with a driving wheel 2, a sealed rotary antifriction bearing mounted on said crank pin and a main rod 3, a front side rod 4 and two intermediate side rods 5, all having their adjacent ends journaled on said bearing. The rotary antifriction bearing shown in the accompanying drawings is a double, taper roller bearing comprising two caged circular series of tapered bearing rollers 6 spaced apart longitudinally of the crank pin 1. The innermost series of tapered bearing rollers cooperate with a conical inner raceway provided therefor on the crank pin 1; and the outer series of rollers cooperate with a depressed conical raceway of an inner raceway member or cone 7 that is pressfitted on said crank pin. The two series of bearing rollers 6 cooperate with conical outer raceways provided therefor in a common cup or outer raceway member 8, the conical outer raceway for the innermost series of rollers being depressed.

A replaceable steel sleeve 9 is pressfitted or shrunk on the cup or outer raceway member 8 of the roller bearing and forms a journal for the locomotive drive rods 3, 4 and 5. A suitable spacing sleeve 10 is mounted on the journal sleeve 9 between the front side rod 4 and the adjacent intermediate side rod 5. Annular spacing plates 11 are mounted on the journal sleeve 9 between the main rod 3 and the intermediate side rods 5. An abutment ring 12 is sleeved on the outer raceway member 8 between an external annular shoulder 13 thereon near the inner end thereof and the front side rod 4. An abutment ring 14 is sleeved on the outer end of the journal sleeve 9 between the outermost intermediate side rod 5. The drive rods 3, 4 and 5, spacing sleeve 10, annular spacing plates 11 and abutment rings 12 and 14 are all held on the bearing by the eccentric crank 15 of the locomotive valve gear (not shown), said crank being rigidly secured to the outer end of said crank pin by means of a pin 16. The annular space between the outer raceway member 8 and the crank pin 1 is closed at the outer and inner ends of the bearing by means of end closures 17 and 18, respectively. This annular space is supplied with lubricant from an axial reservoir 19 in the crank pin 1 through radial passageways 20 therein.

The end closure 18 for the inner end of the locomotive rod bearing is in the form of an annular sealing plate or ring having an internally grooved hub 21 that surrounds a sleeve 22 that is pressfitted on the crank pin 1 and has its end nearest the drive wheel 2 shaped to provide an annular groove 23 adapted to receive the adjacent end of said hub. The outer and inner ends of the outer raceway member 8 are counterbored, as at 28, to snugly receive and form annular seats or shoulders 29 for the end closures 17 and 18, respectively. The outermost end closure 17 also comprises an annular sealing plate or ring having an internally and externally grooved hub 24, which fits around a sleeve 25 that is mounted on the outer end portion of the inner raceway member 7 and has its outer end shaped to provide an annular groove 26 for the outer end portion of said hub and an inwardly extending flange 27 that is clamped between the opposing end faces of said raceway member and the eccentric crank 15.

Each of the annular end closures 17 and 18 for the lubricant containing roller bearing is tightly pressed or clamped endwise against the annular seat 29 provided therefor by the counterbore 28 of the outer raceway member 8 of said bearing by means of a split expansible locking or clamping ring 30 whose outer peripheral margin is disposed within but clear of the bottom of an internal annular groove 31 provided therefor in said counterbore adjacent to the outer end face of said end closure. The outer side wall of the groove 31 and the opposing end face of the split snap ring 30 cooperating therewith are inclined or chamfered, as at 32 and 33, respectively, so that expansion of said ring will move the same axially inwardly against the outer end face of the adjacent end closure and thus press the latter tightly against the annular seat 29 provided therefor in the counterbore 28 in the outer raceway member 8.

As shown in the drawings, each of the locking rings 30 comprises a stamped annular plate split radially, as at 34, and having a portion of its outer peripheral edge cut away or slabbed adjacent to said split to form a flat edge portion 35 which reduces the width of the ring along a diameter passing through said flat edge portion. Before mounting, a portion of the locking ring 30 between the inner periphery thereof and the flattened outer periphery 35 thereof is circumferentially bowed or crimped, as at 36, on its chamfered outer end face to thereby shorten said ring circumferentially and thus reduce the diameter thereof. The bowed, split ring 30 is mounted in the bearing by snapping the ring into the internal annular groove 31 in the outer raceway member 8 with the convex surface of the bowed or offset portion 35 of said ring and the chamfered surface 33 thereof facing outwardly. The bowed portion 36 of the split locking ring is then straightened preferably by hammering said portion flat against the adjacent end closure, thereby increasing the diameter of the ring and thus causing the chamfered edge 33 thereof to wedge tightly against the chamfered outer wall 32 of the mounting groove and wedge or press said end closure tightly against the annular seat or shoulder 29 in the counterbore 28 of the outer raceway member 8 of the bearing.

By the arrangement described, the end closure plates are held by the expanded locking rings tightly against the seats provided therefor in the bore of the outer raceway member and thus prevent leakage of the lubricant between said end closure and said outer raceway members, while the labyrinth effect of the sleeves and hub portions of the end closures prevent the escape of oil from and entry of dust into the bearing space through the joints between said end closures and said sleeves. The split locking rings are removable by reversing the assembly method; that is by again bowing outwardly the narrow slabbed portion of said ring and then further contracting the bowed ring by pressing together the ends thereof.

The invention is not limited to the particular bearing construction shown and described.

What I claim is:

1. In a roller bearing, a member having a bore with an internal annular groove therein, and an expansible locking ring mounted in said groove and having a portion of its outer periphery disposed entirely outside of said groove before and after said ring is expanded, said portion having a bend formed therein before mounting adapted when straightened to increase the diameter of said ring and thus expand the same in said groove.

2. Closure means for the annular space between relatively rotatable inner and outer members comprising an annular end closure interposed between said members adjacent to one end thereof, said outer member having an internal annular groove therein outwardly of said closure, and a split locking ring for said closure mounted in said groove, said ring having a bend formed therein before mounting adapted when straightened to increase the diameter of said ring and thus expand the same in said groove, said ring having its outer peripheral edge slabbed opposite the bendable portion thereof whereby the width of said bendable portion is less than the width of the remaining portion of said ring and said bendable portion is located entirely outside said groove before and after straightening.

3. Closure means for the annular space between relatively rotatable inner and outer members comprising an annular end closure interposed between said members adjacent to one end thereof, said outer member having an internal annular groove therein, and an expansible locking ring for said closure mounted in said groove and having a portion of its outer periphery disposed entirely outside of said groove before and after said ring is expanded, said portion having a bend formed therein before mounting adapted when straightened to increase the diameter of said ring and thus expand the same into said groove.

4. Closure means for the annular space between relatively rotatable inner and outer members comprising an annular end closure interposed between said members adjacent to one end thereof, said outer member having an internal annular groove and an internal annular seat for the inner end face of said closure inwardly of said groove, and a split ring mounted in said groove for holding said closure against said seat, said ring having a circumferentially bowed portion formed therein before mounting adapted when flattened against the outer end face of said closure to increase the diameter of said ring and thus expand the same into said groove, the outer peripheral edge of said ring along the bowed portion thereof being disposed entirely clear of said groove before and after said bowed portion is flattened.

5. A locking ring having a circumferentially bowed portion adapted when flattened to increase the diameter of said ring the outer peripheral edge of said ring being cut away along said bowed portion.

6. A locking ring comprising a split annular plate having a flattened outer edge whereby the portion of said annular plate between the inner periphery thereof and the flattened outer edge thereof is of less width than the remaining portion thereof, said portion being offset from the plane of said annular plate and adapted when flattened to increase the diameter of said ring.

RALPH E. HORGER.